(No Model.)
A. F. BOARDMAN.
GUIDE FOR FISHING LINES.
No. 506,093. Patented Oct. 3, 1893.
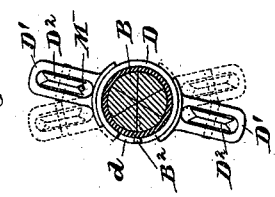
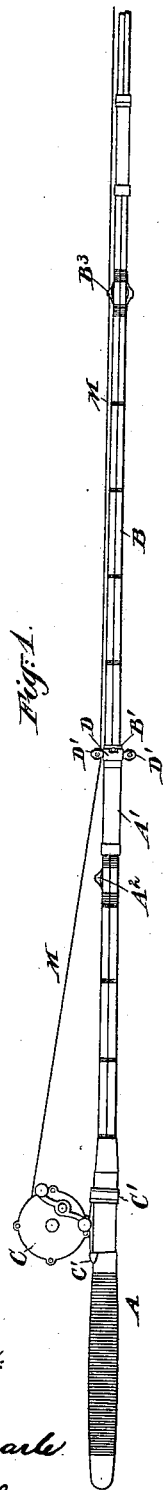
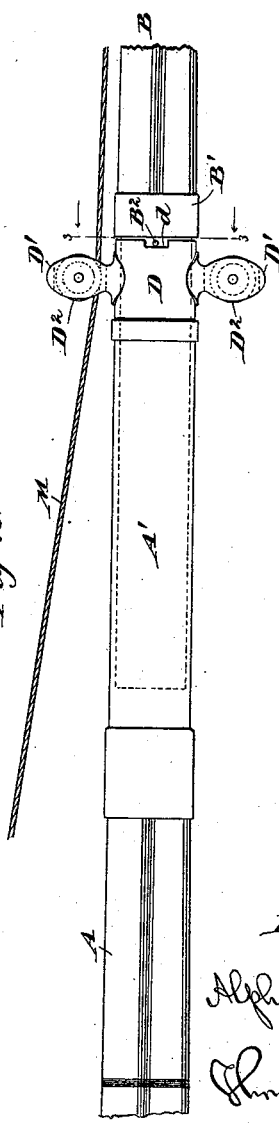
Witnesses:
Charles R. Searle
M. F. Boyle
Inventor:
Alphonso F. Boardman
by his attorney
Thomas Drew Stetson

UNITED STATES PATENT OFFICE.

ALPHONSO F. BOARDMAN, OF BROOKLYN, NEW YORK.

GUIDE FOR FISHING-LINES.

SPECIFICATION forming part of Letters Patent No. 506,093, dated October 3, 1893.

Application filed January 17, 1893. Serial No. 458,718. (No model.)

*To all whom it may concern:*

Be it known that I, ALPHONSO F. BOARDMAN, a citizen of the United States, residing in Brooklyn, Kings county, in the State of New York, have invented a certain new and useful Improvement Relating to Running-Guides on Fishing-Rods, of which the following is a specification.

My running guide is free to vibrate by turning to the right and left on the rod to a limited extent, sufficient to compensate for the varying points on the reel from which the line is delivered. It lies intermediate between the reel and the first fixed guide, and turns automatically into the correct positions as the line is delivered from the reel to the eye or is drawn in from the eye to the reel. It is detachable, and can be used or not at pleasure. I provide the turning guide with an eye having a grooved pulley through which the line runs without appreciable friction. I propose to provide two such eyes on opposite sides of the device, so that either may serve in case of accident to the other, or in case the rod should require to be worked either side up.

The accompanying drawings form a part of this specification and represent what I consider the best means of carrying out the invention.

Figure 1 is a side elevation of the portion of the rod to which my invention relates. The remaining figures are on a larger scale. Fig. 2 is an elevation and Fig. 3 a transverse section on the line 3—3 in Fig. 2. The dotted lines in Fig. 3 indicate the extent to which the guide may vibrate.

Similar letters of reference indicate corresponding parts in all the figures where they appear.

A is the butt, and B the second length of the rod.

A' is the ordinary metallic ferrule which strengthens the end of the butt, and is adapted to receive socketwise the adjacent end B' of the second length.

C is a reel of any ordinary or suitable construction, secured removably to the butt A by the ordinary bands C', C'. The line M is wound in the ordinary manner on the spool in the reel.

D is the ring or main body of my oscillating guide. It is of a size adapted to fit loosely on the second length B. It is formed with a sufficiently broad notch $d$, which engages a pin $B^2$, permanently set in the length B in the position shown, and allows liberty for the guide to make partial revolutions or vibrations on the length B as an axis.

$B^3$ is the first fixed guide for the line.

B' D' are eyes brazed or otherwise fixed on the body B, and carrying each a grooved sheave $D^2$. The line M, as it comes from the reel, is passed under one of the sheaves $D^2$, and thence through the fixed guide $B^3$. Only one eye D' and sheave $D^2$ are required at any one time. The second allows of inverting the rod. Either may serve in case of accident to the other. The pin $B^2$ is set at such point on the length B that when the latter is forced home into its socket on the butt, there is just sufficient space for my guide to be held and allowed to turn to the limited extent desired.

To use the invention, my guide is slipped on the second length B, and the latter is socketed into the butt. Then the line M is led through the proper eye D', and thence through the guide $B^3$ and the other guides, not shown, in the several successive lengths; and when in the running out of the line it comes successively from the mid-length of the spool and each end of the spool at different periods, my swiveling guide turns correspondingly but to a less extent to the right and left, and keeps itself always in the position to receive the line in the most favorable condition and deliver it correctly to the next guide eye. It is free to similarly turn and assume the best position when the line is being reeled in being automatically turned under either condition by the tension of the line as it tends to extend directly between the fixed guide $B^3$ and the middle or either end of the spool as required. If for any reason my swiveling guide is not required, it is simply retained in the tackle-box, and the second length B inserted in the socket A without it. In such case the line M will be rove through the ordinary rigid guide $A^2$, on the butt.

The two eyes D' on opposite sides of my guide are certain to present one favorably when the rod is turned as is frequently done in correcting a bent condition. The two eyes allow the device to be used in either position of the rod.

I claim as my invention—

1. The combination with a fishing rod butt A, reel C, and fixed guide $B^3$ of the vibrating guide D, having a guide eye $D'$ and grooved sheave $D^2$, and means as the notch $d$, and pin or stop $B^2$ for limiting the extent of the vibration, all substantially as herein specified.

2. The fishing rod butt A having a ferrule $A'$, second length B having a pin or stop $B^2$ and the vibrating guide D $D'$, mounted between them so as to be removed on the separation of the lengths, in combination with each other and with the reel C and fixed guide $B^3$ adapted to serve as herein specified.

3. In a fishing rod the butt A, having a ferrule $A'$, second length B having the pin $B^2$ and vibrating guide D, having the notch $d$, two eyes $D'$ and sheaves $D^2$, in combination with each other and with the reel C and fixed guide $B^2$, arranged for joint operation substantially as herein specified.

In testimony that I claim the invention above set forth I affix my signature in presence of two witnesses.

ALPHONSO F. BOARDMAN.

Witnesses:
 M. F. BOYLE,
 CHARLES R. SEARLE.